United States Patent
Takada et al.

(10) Patent No.: US 10,389,247 B2
(45) Date of Patent: Aug. 20, 2019

(54) POWER CONVERSION DEVICE AND CONTROL CIRCUIT INCLUDING STOP TRANSITIONING TO STOP STATE

(71) Applicant: SANKEN ELECTRIC CO., LTD., Niiza-Shi, Saitama (JP)

(72) Inventors: Junichi Takada, Kawagoe (JP); Mitsutomo Yoshinaga, Koshigaya (JP); Toshihiro Nakano, Kawagoe (JP); Koki Imai, Tomioka (JP); Osamu Ohtake, Saitama (JP)

(73) Assignee: SANKEN ELECTRIC CO., LTD., Niiza-Shi (JP)

( * ) Notice: Subject to any disclaimer, the term of this patent is extended or adjusted under 35 U.S.C. 154(b) by 0 days.

(21) Appl. No.: 15/935,104

(22) Filed: Mar. 26, 2018

(65) Prior Publication Data

US 2019/0006945 A1    Jan. 3, 2019

(30) Foreign Application Priority Data

Jun. 30, 2017  (JP) .................................. 2017-128793
Feb. 14, 2018  (JP) .................................. 2018-023930

(51) Int. Cl.
*H02M 1/32*    (2007.01)
*H02M 1/36*    (2007.01)
(Continued)

(52) U.S. Cl.
CPC .......... *H02M 3/158* (2013.01); *H02H 7/1213* (2013.01); *H02M 1/32* (2013.01);
(Continued)

(58) Field of Classification Search
CPC ................... H02M 1/36; H02M 3/158; H02M 2001/0032; H02M 2001/0035; H02M 1/32; H02H 7/1213
(Continued)

(56) References Cited

U.S. PATENT DOCUMENTS

2002/0023241 A1*  2/2002  Kabune ..................... G06F 1/24
                                                    714/22
2006/0247835 A1*  11/2006  Nagata ..................... F02D 41/22
                                                    701/36
(Continued)

FOREIGN PATENT DOCUMENTS

| JP | H06-38361 A   | 2/1994 |
| JP | 106-164464 A  | 6/1994 |
| JP | 108-211972 A  | 8/1996 |

*Primary Examiner* — Alex Torres-Rivera
*Assistant Examiner* — David A. Singh
(74) *Attorney, Agent, or Firm* — Metrolex IP Law Group, PLLC

(57) ABSTRACT

A power conversion device according to one or more embodiments may include: a microcomputer; and an output circuit controlled by the microcomputer, including an output unit that converts an input power into a predetermined power and outputs the predetermined power, an internal power source that supplies a power source to the microcomputer, a driver that drives the output unit by a signal from the microcomputer, and a microcomputer stop transition unit that, when an operation of the power conversion device is stopped, outputs a microcomputer stop signal to the microcomputer and causes an operation of the microcomputer to transition to a stop state. In one or more embodiments, after the microcomputer stop transition unit causes the operation of the microcomputer to transition to a stop state, the microcomputer or the output circuit may stop an output of the internal power source.

14 Claims, 16 Drawing Sheets

(51) Int. Cl.
  *H02M 1/00* (2006.01)
  *H02M 3/158* (2006.01)
  *H02H 7/12* (2006.01)
  *H02M 3/157* (2006.01)

(52) U.S. Cl.
  CPC ............ *H02M 1/36* (2013.01); *H02M 3/157* (2013.01); *H02M 2001/0006* (2013.01); *H02M 2001/0032* (2013.01); *H02M 2001/0035* (2013.01)

(58) Field of Classification Search
  USPC ................................ 323/234, 265, 268, 271
  See application file for complete search history.

(56) References Cited

U.S. PATENT DOCUMENTS

| | | | |
|---|---|---|---|
| 2009/0198407 A1* | 8/2009 | Sakai | B60W 50/0205 701/29.1 |
| 2012/0020136 A1* | 1/2012 | Akaishi | H02M 7/48 363/131 |
| 2013/0015797 A1* | 1/2013 | Itou | H02P 6/12 318/400.21 |
| 2015/0100811 A1* | 4/2015 | Itou | G06F 1/3293 713/324 |
| 2016/0117214 A1* | 4/2016 | Itou | G06F 11/0706 714/55 |
| 2017/0019051 A1* | 1/2017 | Fujie | H02J 1/00 |
| 2017/0349048 A1* | 12/2017 | Nakayama | B60L 3/0092 |

* cited by examiner

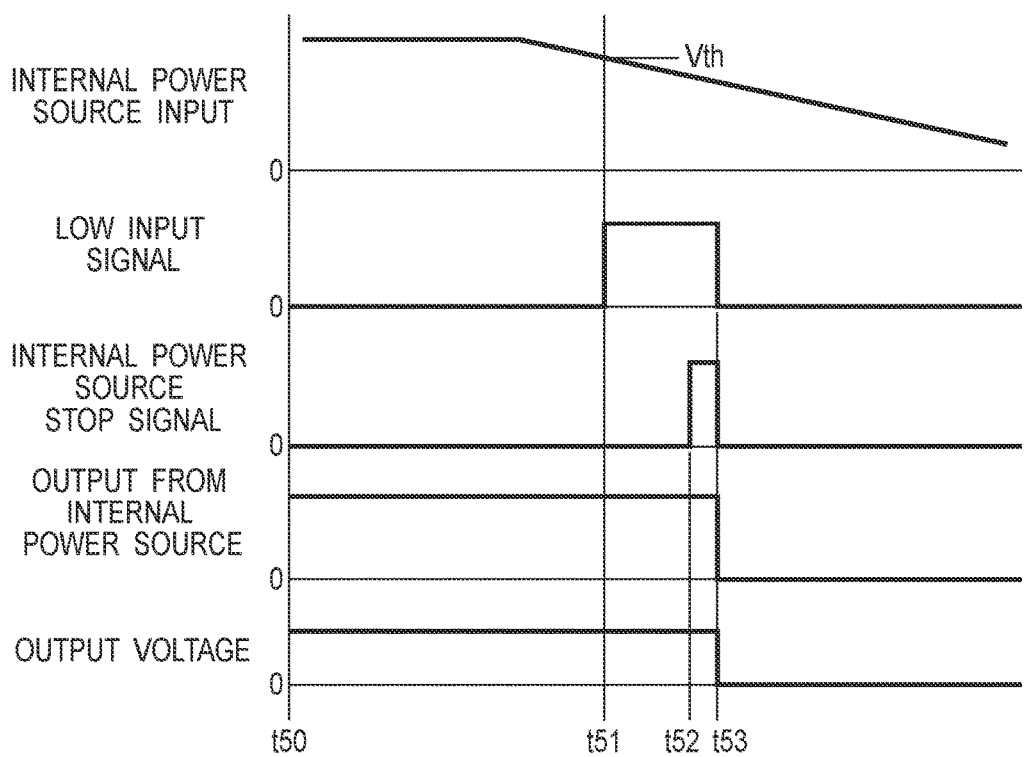
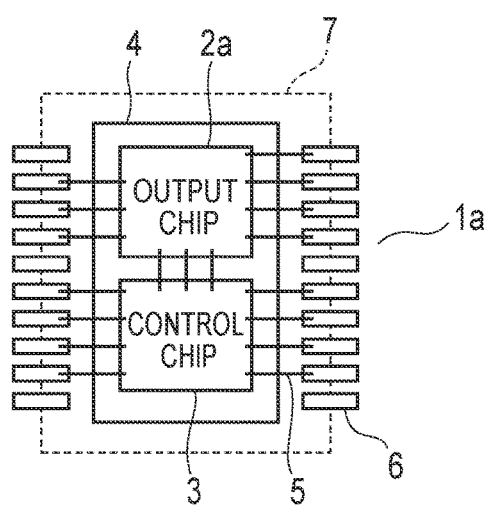

POWER CONVERSION DEVICE AND CONTROL CIRCUIT INCLUDING STOP TRANSITIONING TO STOP STATE

CROSS REFERENCE TO RELATED APPLICATIONS

This application claims priority to Japanese Patent Applications No. 2017-128793 filed on Jun. 30, 2017, and No. 2018-23930 filed on Feb. 14, 2018, entitled "POWER CONVERSION DEVICE AND CONTROL CIRCUIT", the entire contents of which is incorporated herein by reference.

BACKGROUND

The disclosure relates to the operation of a power conversion device and a control circuit at the time of operation stop.

The technology described in Japanese Unexamined Patent Application Publication No. 6-38361 is known as a power conversion device in related art.

The DC/DC converter as a power conversion device described in Japanese Unexamined Patent Application Publication No. 6-38361 is controlled by a microcomputer. A DC voltage is supplied from a commercial AC input to a power source which drives the microcomputer through a transformer, a rectifying smoothing unit, a switch, and a regulator. In order to reduce loss of the regulator, the transformer decreases the voltage of the commercial AC input. The switch is used to stop the operation of the microcomputer. When the output of the DC/DC converter is in an abnormal state, the microcomputer outputs a shutdown signal to the DC/DC converter and the switch to stop the operation of the DC/DC converter and the regulator. The microcomputer performs stop processing by the time when the output of the regulator starts to be stepped down.

However, in a DC/DC converter in related art, the microcomputer has to perform stop processing such as data saving by the time when the output of the regulator starts to be reduced. For this reason, if the time taken for the output of the regulator to start to be reduced is short, the data saving or the like may not be completed. If the data saving is not performed normally, the stop processing of the microcomputer may not be safely performed. To cope with this, the time taken for the output of the regulator to start to be reduced has to be increased, and thus the operation of the DC/DC converter cannot be quickly stopped.

Also, the above-mentioned transformer is a commercial AC transformer, and thus has a large size. In order to reduce the loss of the regulator without using the transformer, when the output voltage of the DC/DC converter is low, connecting the input of the regulator to the output voltage of the DC/DC converter reduces the loss. However, when the output of the DC/DC converter is lowered due to an operation of protection against overheat of the DC/DC converter, the power source of the microcomputer is reduced in power, and the microcomputer may not be able to safely perform the stop processing such as data saving. The DC/DC converter needs a function similar to the function of the regulator which supplies a power source to the microcomputer, and this leads to increase in chip size.

SUMMARY

A power conversion device according to one or more embodiments may include: a microcomputer; and an output circuit controlled by the microcomputer, including an output unit that converts an input power into a predetermined power and outputs the predetermined power, an internal power source that supplies a power source to the microcomputer, a driver that drives the output unit by a signal from the microcomputer, and a microcomputer stop transition unit that, when an operation of the power conversion device is stopped, outputs a microcomputer stop signal to the microcomputer and causes an operation of the microcomputer to transition to a stop state. In one or more embodiments, after the microcomputer stop transition unit causes the operation of the microcomputer to transition to a stop state, the microcomputer or the output circuit may stop an output of the internal power source.

A control circuit according to one or more embodiments may include: a microcomputer; an output circuit controlled by the microcomputer, including an internal power source that supplies a power source to the microcomputer, a driver that drives an output unit, which converts an input power into a predetermined power and outputs the predetermined power, by a signal from the microcomputer, and a microcomputer stop transition unit that, when an operation of the power conversion device is stopped, outputs a microcomputer stop signal to the microcomputer and causes an operation of the microcomputer to transition to a stop state. In one or more embodiments, after the microcomputer stop transition unit causes the operation of the microcomputer to transition to a stop state, the microcomputer or the output circuit may stop an output of the internal power source.

BRIEF DESCRIPTION OF DRAWINGS

FIG. 10 is a timing chart illustrating the operation of each unit of the DC/DC converter according to embodiment 5;

FIG. 11 is a diagram illustrating the internal configuration of the DC/DC converter according to embodiment 1, embodiment 2, embodiment 3, embodiment 4, and embodiment 5;

DETAILED DESCRIPTION

Embodiment 1

Figure 1:
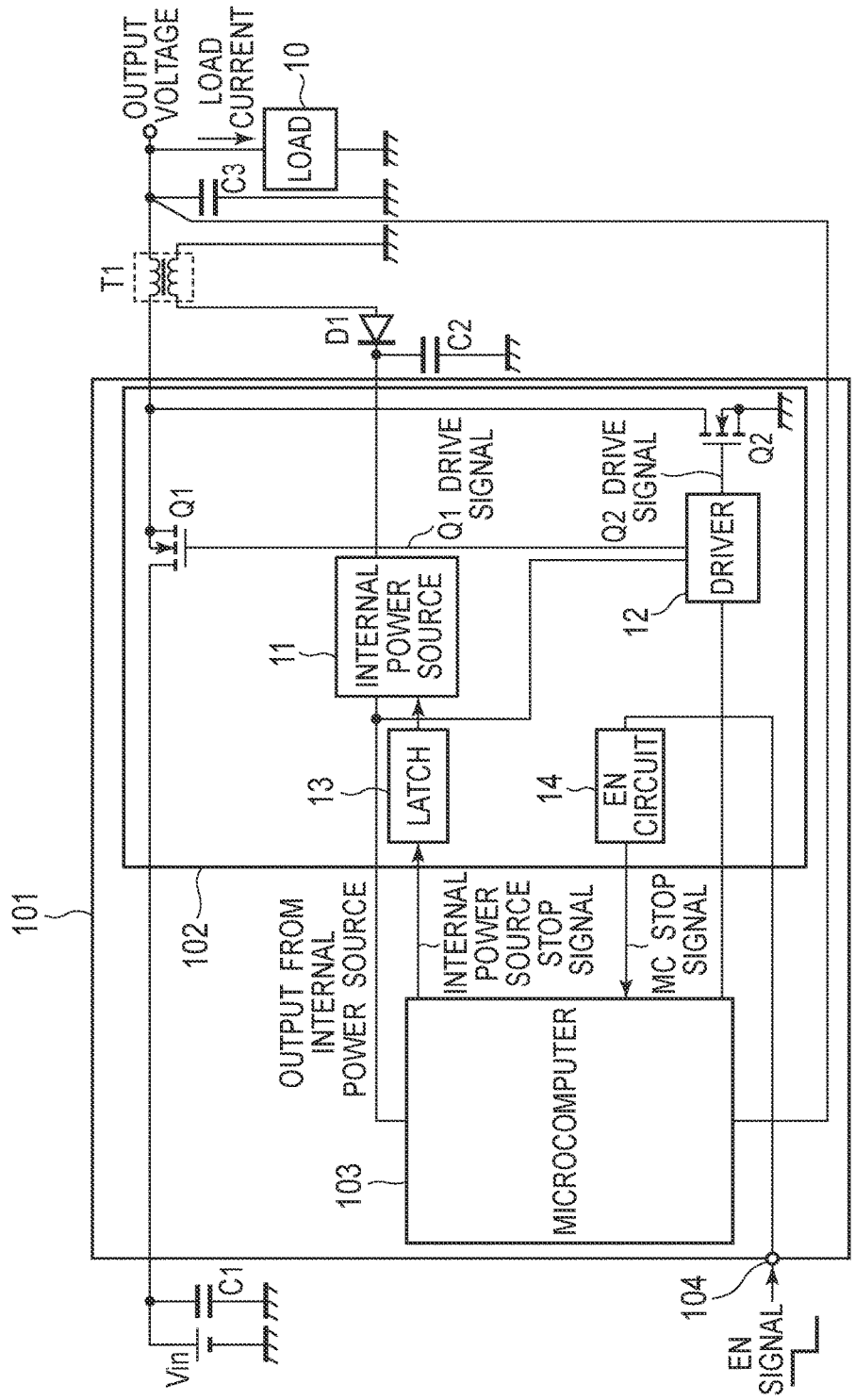
FIG. 1 is a circuit configuration diagram illustrating an implementation of a DC/DC converter according to embodiment 1.
Figure 2:
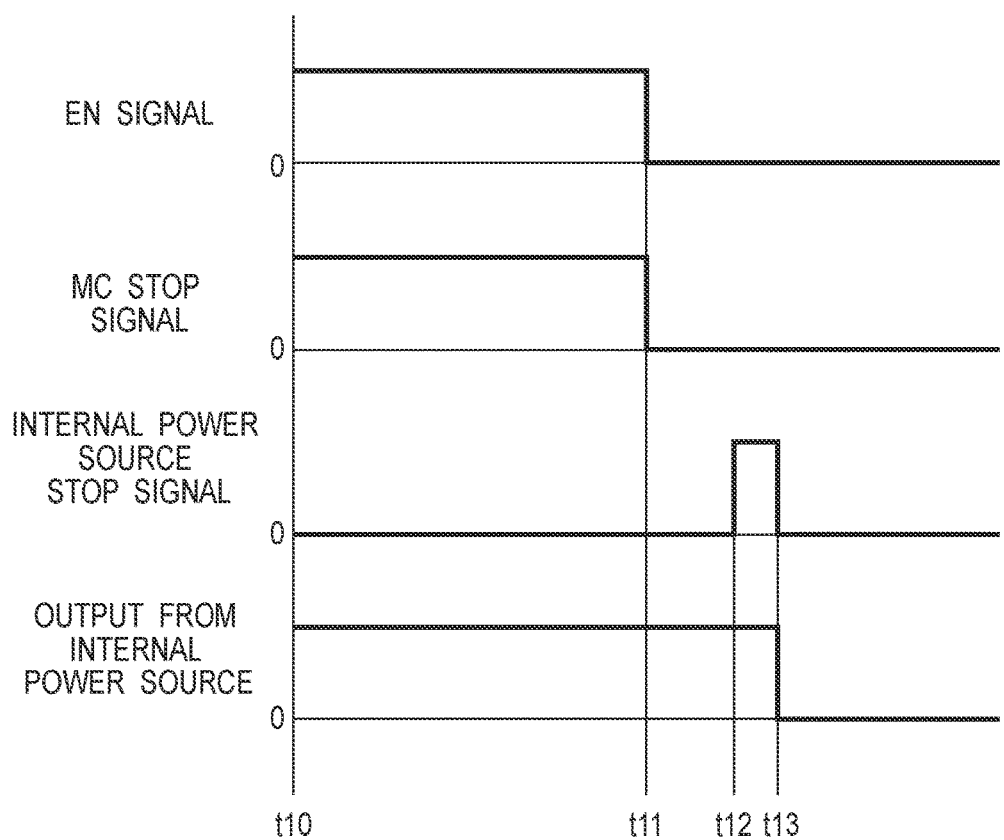
FIG. 2 is a timing chart illustrating the operation of each unit of the DC/DC converter according to embodiment 1.

Embodiments of the invention are explained with referring to drawings. In the respective drawings referenced herein, the same constituents are designated by the same reference numerals and duplicate explanation concerning the same constituents is basically omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratios are different from one drawing to another. FIG. 1 is a diagram illustrating a circuit configuration of a DC/DC converter 101 as a power conversion device according to embodiment 1. FIG. 2 is a timing chart illustrating the operation of each unit of the DC/DC converter 101 according to embodiment 1. The DC/DC converter 101 has a mode, in which the operation is stopped by an enable (EN) signal, depending on stand-by or an operation mode. Embodiment 1 relates to stop of the operation of the power conversion device by the EN signal.

An input power source Vin of the DC/DC converter 101 is a high voltage obtained by smoothing the AC. When the input of an internal power source, which supplies a power source to the internal circuit of the DC/DC converter 101, is connected to the input power source Vin, the loss of the internal power source 11 is increased. When the input of the internal power source 11 is connected to output voltage of DC/DC converter 101, a low output voltage causes the loss of the internal power source 11 to be reduced, whereas a high output voltage causes the same problem.

In order to address this problem, a switching output outputted from the source of a switching device Q1 is stepped down in voltage by a transformer T1, the stepped down switching output is rectified by a diode D1, and a DC voltage, which is smoothed by a capacitor C2, is inputted to the internal power source 11. Consequently, the loss of the internal power source 11 can be reduced. The switching device Q1 is driven by a high frequency, and thus the size of the transformer T1 can be more reduced than the size of a commercial AC transformer.

As illustrated in FIG. 11, the DC/DC converter 1 includes an output chip 2 that is an output circuit of the DC/DC converter 1; a control chip 3 that is a microcomputer for controlling the output circuit; a frame 4 in which the output chip 2 and the control chip 3 are mounted; a wire 5 for connecting the output chip 2, the control chip 3, and leads 6; the leads 6 for connecting the wire 5 to an external wire; and a mold 7 for protecting the output chip 2, the control chip 3, the frame 4, the wire 5, and the leads 6. The output chip 2 and the control chip 3 may be mounted on the same frame, and packaged. Thus, miniaturization of the outside shape of the DC/DC converter can be achieved. A high voltage is applied to the output chip, thus the output chip is manufactured in a high voltage process, whereas the control chip 3 is a microcomputer, thus is manufactured in a fine process, and high voltage resistance is reduced. The output chip 2 and the control chip 3 can be formed in a process with an optimal voltage resistance by forming each by an individual chip, which is advantageous in reducing the chip size.

As illustrated in FIG. 1, an output chip 102, which is an output circuit of the DC/DC converter 101, includes an internal power source 11, a driver 12, a latch 13, an EN circuit 14, and a switching device Q1 and a switching device Q2 which are output units that supply a load current to a load 10. The latch 13 may be omitted when latch is not necessary. When a load current is high, the switching device Q1 and the switching device Q2 may be formed by a chip independent from the output chip 102, and may be connected to the outside of the output chip 102.

The both ends of the input power source Vin are connected to an input capacitor C1, the positive side of the power source Vin is connected to the drain of the switching device Q1, and the negative side of the power source Vin is grounded. The source of the switching device Q1 is connected to the drain of the switching device Q2 and one end of the primary-side winding wire of the transformer T1. The other end of the primary-side winding wire of the transformer T1 is connected to one end of an output capacitor C3, and the other end of the output capacitor C3 is grounded. The both ends of the output capacitor C3 are connected to a load. One end of the secondary-side winding wire of the transformer T1 is connected to the anode of a diode D1, and the other end of the secondary-side winding wire of the transformer T1 is grounded. The cathode of the diode D1 is connected to the input of the internal power source and one end of the capacitor C2, and the other end of the capacitor C2 is grounded.

The output of the internal power source 11 is connected to the circuits such as the driver 12, the latch 13, and the EN circuit 14 in the output circuit, and a microcomputer 103. The internal power source 11 supplies a power source to the circuits and the microcomputer 103. The gate of the switching device Q1 and the gate of the switching device Q2 are connected to the driver 12. The microcomputer 103 is connected to the internal power source 11 through the latch 13. The EN circuit 14, which receives input of the EN signal, is connected to the microcomputer 103. Also, the microcomputer 103 is connected to one end of the output capacitor C3.

The switching device Q1 turns on and off the input power Vin, the switching device Q2 regenerates the energy stored in the primary-side winding wire of the transformer T1 when the switching device Q1 is OFF, and supplies a load current to the load 10.

The microcomputer 103 detects the voltage across the output capacitor C3 as the output voltage, and outputs a signal to the driver 12 so that the output voltage becomes constant. The driver 12 outputs Q1 drive signal, and drives the switching device Q1 by the Q1 drive signal. The microcomputer 103 controls the output voltage at a constant level by changing the duty ratio of the ON/OFF of the switching device O1 in accordance with the above-mentioned signal. The driver 12 further drives the switching device Q2 by Q2 drive signal which has a reverse phase of Q1 drive signal.

Conventionally when an EN signal at Lo level is applied to the EN circuit 14 through an EN terminal 104 to stop the operation of the DC/DC converter 101, the output of the EN circuit 14 is inputted to the driver 12, and the switching device Q1 is cut off, thereby stopping the load current which flows through the load 10. When the load current is stopped, no current flows through the transformer T1, and a power source is not supplied to the input of the internal power source 11 of the output chip, thus the operation of the internal power source 11 is stopped. When the operation of the internal power source 11 is stopped, a power source is not supplied to the control chip 3. Since the control chip 3 is a microcomputer, when a power source is stopped in an operating state, data saving is not possible, and thus the operation cannot be stopped normally. Depending on a condition, an abnormal operation may occur in the DC/DC converter 101. For this reason, in the present disclosure, even when the operation of the DC/DC converter 101 by the EN signal is stopped, the microcomputer 103 is stopped normally.

FIG. 2 illustrates a timing chart when the operation of DC/DC converter 101 is stopped. When the EN signal inputted to the EN terminal is at Hi level, the output voltage of the DC/DC converter 101 is outputted, and when the EN signal inputted to the EN terminal is at Lo level, the output voltage of DC/DC converter 101 is stopped. At time t10, an EN signal at Hi level is inputted to the EN terminal 104, and the EN circuit 14 outputs an MC stop signal at Hi level, in other words, a microcomputer stop signal to the microcomputer 103. Since the MC stop signal is Hi level, the microcomputer 103 operates normally, and the DC/DC converter 101 outputs the output voltage. At time t11, an EN signal at Lo level is inputted to the EN terminal 104, and the EN circuit 14 corresponds to the microcomputer stop transition unit, and outputs an MC stop signal at Lo level to the microcomputer 103. When receiving an MC stop signal at Lo level from the EN circuit 14, the microcomputer 103 performs writing to a memory during time t11 to t12, and transitions to a shutdown operation. At time t12, the microcomputer 103 completes the writing to a memory, and the microcomputer 103 is in a state which allows shutdown, in other words, a state which allows the internal power source output to be stopped. At time t12, an internal power source stop signal at Hi level is outputted from the microcomputer 103 to the internal power source 11, and at time t13, the internal power source stop signal is switched to Lo level. The latch 13 detects a falling edge of the internal power source stop signal, and stops the internal power source 11. Due to the stop of the internal power source 11, the power source of the driver 12 is shut down, and thus Q1 drive signal and Q2 drive signal are stopped, and the output voltage is reduced.

Since the internal power source 11 is stopped by the above-described method, the DC/DC converter 101 can stop the output voltage quickly and safely. Also, in the above-described configuration, voltage resistance of the output chip 2 and the control chip 3 can be optimized, and thus the chip size can be reduced.

Embodiment 2

Figure 3:
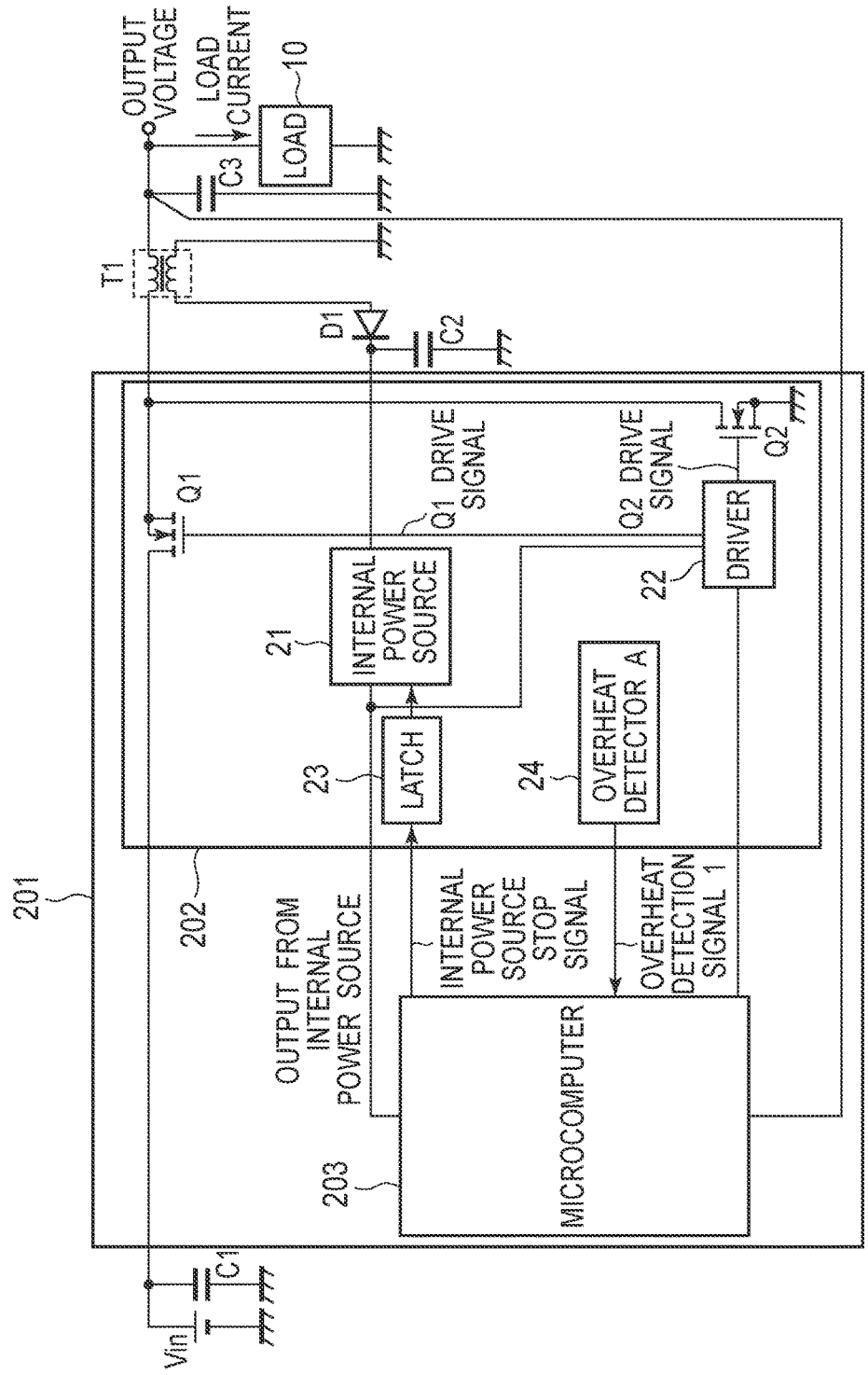
FIG. 3 is a circuit configuration diagram illustrating an implementation of a DC/DC converter according to embodiment 2.
Figure 4:
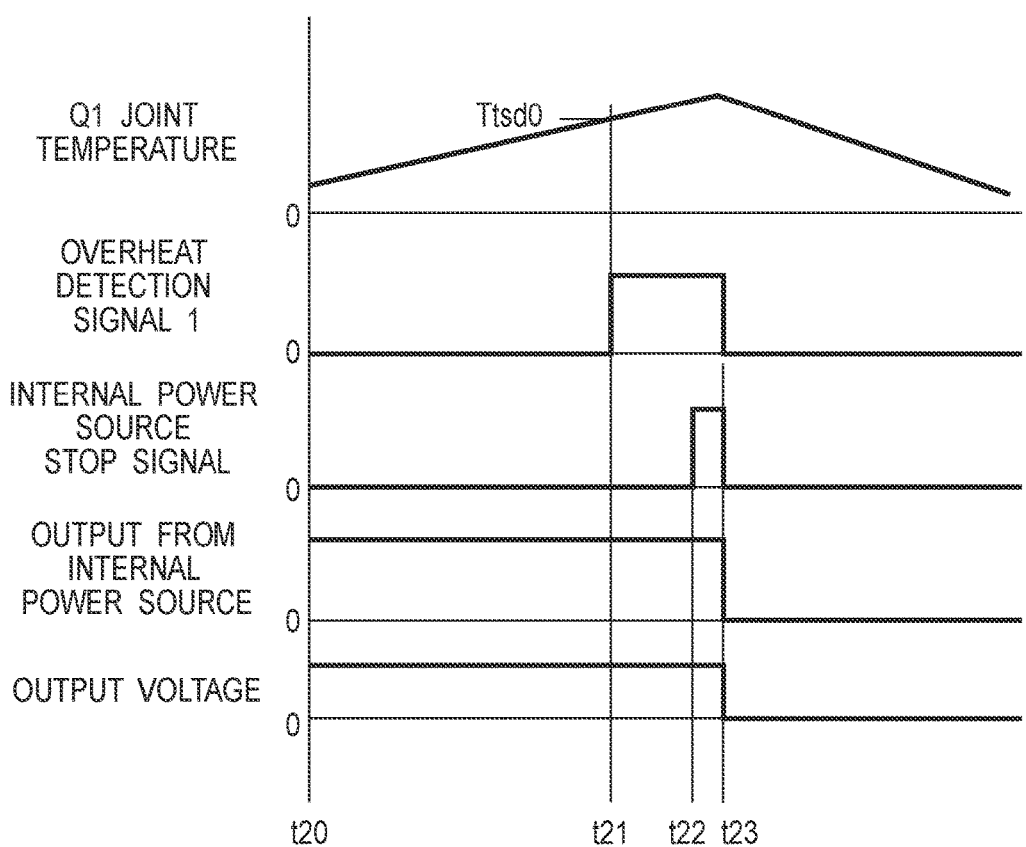
FIG. 4 is a timing chart illustrating the operation of each unit of the DC/DC converter according to embodiment 2.

FIG. 3 is a diagram illustrating the circuit configuration diagram of a DC/DC converter 201 according to embodiment 2. FIG. 4 is a timing chart illustrating the operation of each unit of DC/DC converter 201 according to embodiment 2. embodiment 2 relates to operation stop of the DC/DC converter 201 by overheat detection. In the DC/DC converter 201 in embodiment 2, the EN circuit 14 in embodiment 1 is changed to an overheat detector A24. The operations other than the operation of the overheat detector A24 are the same as in embodiment 1. The overheat detector A24 is arranged in the vicinity of the switching device Q1, and when a detected temperature exceeds a threshold Ttsd0, an overheat detector A24, which is an example of a microcomputer stop transition unit according to one or more embodiments, outputs an overheat detection signal 1 as the microcomputer stop signal to the microcomputer 103.

The operation of embodiment 2 will be described with reference to the timing chart of FIG. 4. At time t20, the load current is increased due to abnormality or the like of the load 10, and the joint temperature of the switching device Q1 is increased. At time t21, when the joint temperature of the switching device Q1 reaches threshold Ttsd0 of the overheat detector A24, the overheat detector A24 outputs an overheat detection signal 1 at Hi level to the microcomputer 103. When receiving an overheat detection signal 1 at Hi level, the microcomputer 103 performs writing to a memory or the like during time t21 to t22, and transitions to a shutdown operation. At time t22, the microcomputer 103 is in a state which allows shutdown, and is in a state which allows the internal power source output to be stopped. The microcomputer 103 outputs an internal power source stop signal at Hi level to a latch 23. At time t23, the internal power source stop signal is switched from Hi level to Lo level. The latch 23 is set at a falling edge of the internal power source stop signal, and the output of the latch 23 is fixed to Hi level. The output of the latch 23 is inputted to an internal power source 21, and the output of the internal power source 21 is stopped. Due to the stop of the internal power source 21, the power source of a driver 22 is shut down, and thus Q1 drive signal and Q2 drive signal are stopped, the output voltage is reduced, and the load current no longer flows through the load 10, which causes the joint temperature of the switching device Q1 to be decreased.

The internal power source 21 is stopped by the latch 23. An overheat state of the DC/DC converter 201 often occurs because of an abnormal state of the load 10, such as short-circuit of wiring or a load short circuit due to breakage of a load, and in many cases, the overheat state of the switching device Q1 continues. Thus, when the switching device Q1 is in an overheat state, the output of the DC/DC converter 201 is stopped by the latch 23, and is prevented from being started, and thus the time during which the DC/DC converter 201 is at a high temperature is reduced. When the abnormality of the load 10 is removed, the operation of the DC/DC converter 201 is resumed by restarting the input power Vin. The same operational effect as in embodiment 1 is obtained by performing the operation as described above.

Embodiment 3

Figure 5:
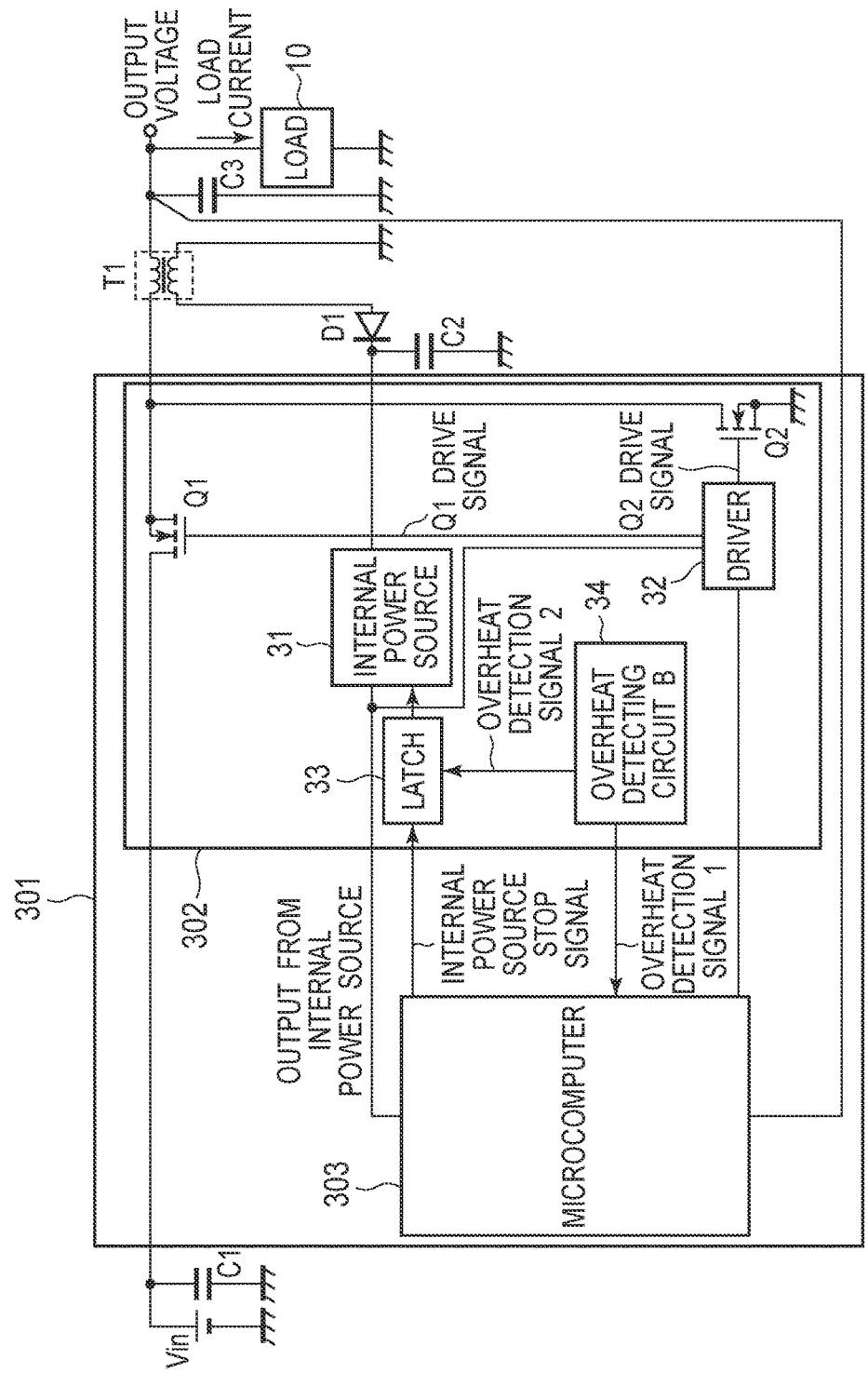
FIG. 5 is a circuit configuration diagram illustrating an implementation of a DC/DC converter according to embodiment 3.
Figure 6:
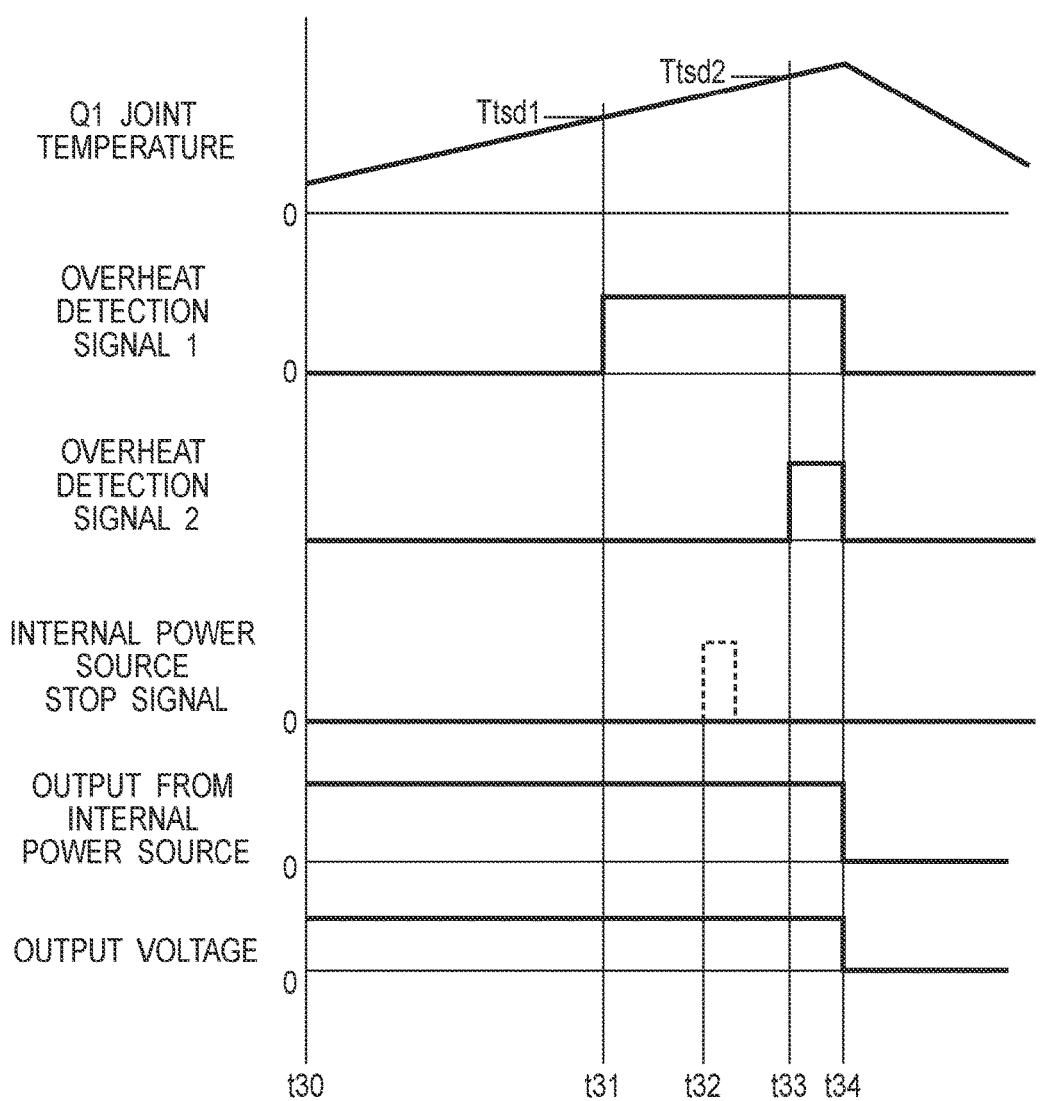
FIG. 6 is a timing chart illustrating the operation of each unit of the DC/DC converter according to embodiment 3.

FIG. 5 is a diagram illustrating the circuit configuration of a DC/DC converter 301 according to embodiment 3. FIG. 6 is a timing chart illustrating the operation of each unit of the DC/DC converter 301 according to embodiment 3. Embodiment 3 relates to operation stop of the DC/DC converter 301 by overheat detection. In the DC/DC converter 301 in embodiment 3, the overheat detector A24 in embodiment 2 is changed to an overheat detector B34. The overheat detector B34 is connected to a microcomputer 303, and a latch 33. The operation other than the operation of the overheat detector B34 are the same as in embodiment 2. The overheat detector B34 has two thresholds Ttsd1, Ttsd2 for overheat detection. The threshold Ttsd2 for overheat detection may be set higher than Ttsd1.

The operation of embodiment 3 will be described with reference to the timing chart of FIG. 6. At time t30, the load current is increased due to abnormality or the like of the load 10, and the joint temperature of the switching device Q1 is increased. At time t31, when the joint temperature of the switching device Q1 reaches Ttsd1 which is a first threshold of the overheat detector B34, the overheat detector B34, which is an example of the microcomputer stop transition unit according to one or more embodiments, outputs an overheat detection signal 1 at Hi level as the microcomputer stop signal to the microcomputer 303. Similarly to embodiment 2, when receiving an overheat detection signal 1, the microcomputer 303 transitions to a shutdown operation. However, due to breakage or malfunction of the microcomputer 303, an internal power source stop signal, which is originally to be outputted at time t32, may not be outputted. In this case, the joint temperature of the switching device Q1 is further increased in order to continue the operation of the output circuit. At time t33, when the joint temperature of the switching device Q1 reaches Ttsd2 which is a second threshold of the overheat detector B34, the overheat detector B34 outputs an overheat detection signal 2 at Hi level to the latch 33. The overheat detection signal 2 is switched from Hi level to Lo level at time t34. The latch 33 is set at a falling edge of the overheat detection signal 2, and the output of the latch 33 is fixed to Hi level. The output of the latch 33 is inputted to an internal power source 31, and the internal power source output, which is the output of the internal power source 31, is stopped. The internal power source 31 is stopped, and the power source of a driver 32 is shut down, and thus Q1 drive signal and Q2 drive signal are stopped, the output voltage is reduced, and the load current no longer flows through the load 10, which causes the joint temperature of the switching device Q1 to be decreased.

The same operational effect as in embodiments 1, 2 is obtained by performing the operation as described above, and even when the microcomputer 303 malfunctions, the power conversion device 301 can be safely stopped.

Embodiment 4

Figure 7:
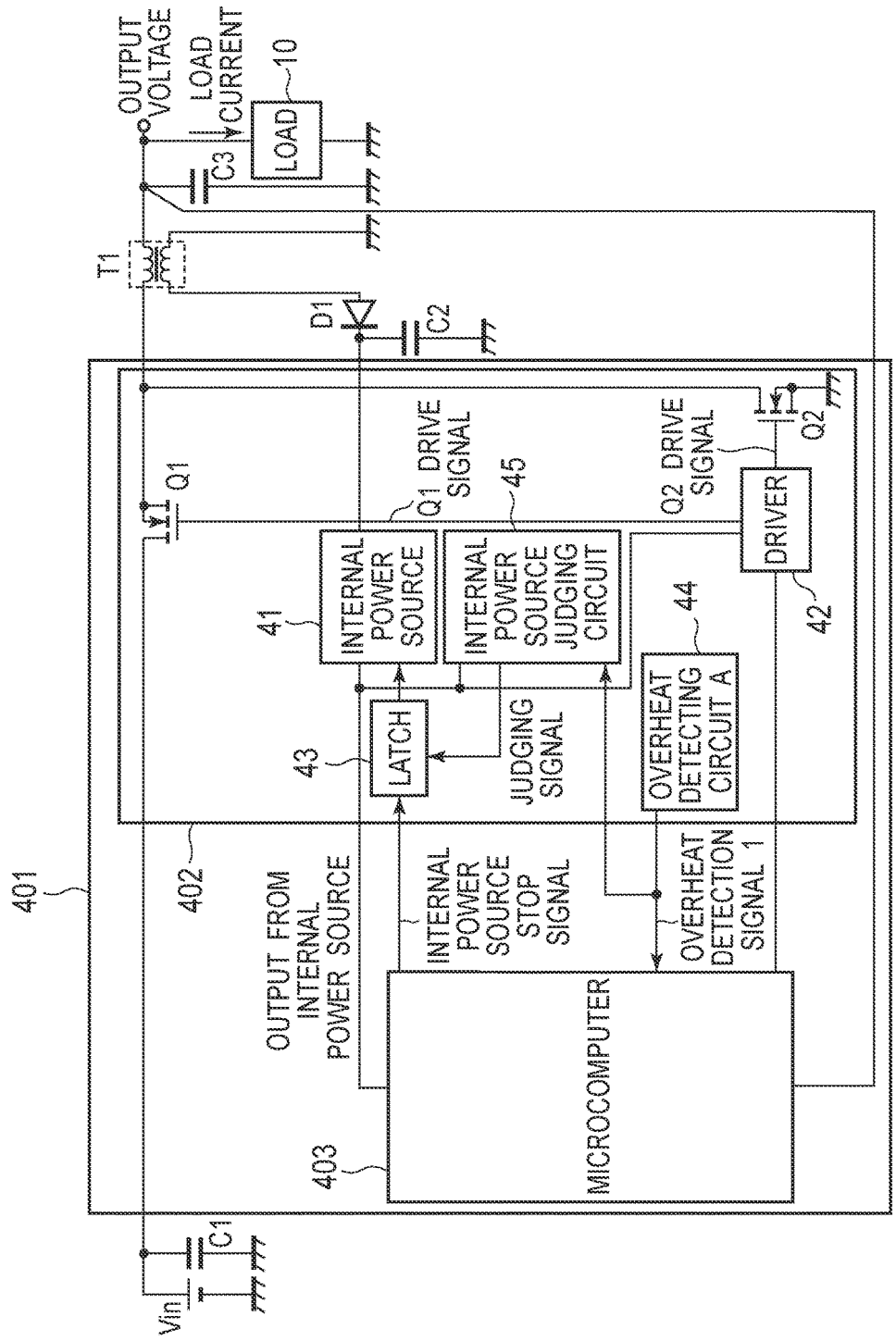
FIG. 7 is a circuit configuration diagram illustrating an implementation of a DC/DC converter according to embodiment 4.
Figure 8:
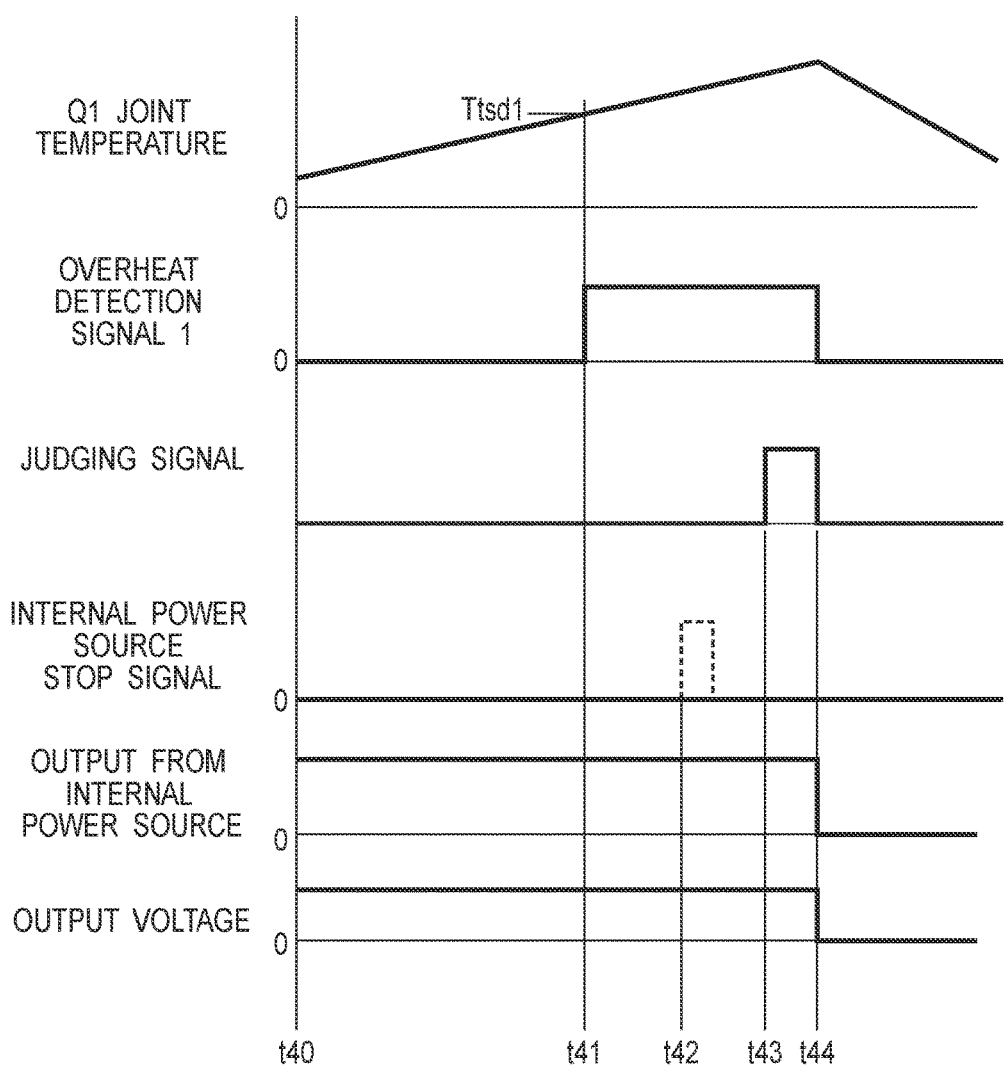
FIG. 8 is a timing chart illustrating the operation of each unit of the DC/DC converter according to embodiment 4.

FIG. 7 is a diagram illustrating the circuit configuration of a DC/DC converter 401 according to embodiment 4. FIG. 8 is a timing chart illustrating the operation of each unit of the DC/DC converter 401 according to embodiment 4. Embodiment 4 relates to operation stop of the DC/DC converter 401 by overheat detection. In the DC/DC converter in embodiment 4, an internal power source judging circuit 45 is added to embodiment 2. The internal power source judging circuit 45 is connected to an overheat detector A44, an internal power source 41, and a latch 43.

The operation of embodiment 4 will be described with reference to the timing chart of FIG. 8. At time t40, the load current is increased due to abnormality or the like of the load 10, and the joint temperature of the switching device Q1 is increased. At time t41, when the joint temperature of the switching device Q1 reaches Ttsd0 which is a threshold of the overheat detector A44, the overheat detector A44, which is an example of the microcomputer stop transition unit according to one or more embodiments, outputs an overheat detection signal 1 at Hi level as the microcomputer stop signal to a microcomputer 403. Similarly to embodiment 2, when receiving an overheat detection signal 1 at Hi level, the microcomputer 403 transitions to a shutdown operation. However, due to breakage or malfunction of the microcomputer 403, an internal power source stop signal, which is originally to be outputted at time t42, may not be outputted. In this case, the joint temperature of the switching device Q1 is further increased. After the overheat detection signal 1 is outputted, the internal power source judging circuit 45 monitors the internal power source output which is the output of the internal power source 41. In the case where the internal power source output, which is the output of the internal power source 41, is outputted even after elapse of a predetermined time since the output of the overheat detection signal 1, at time t43, the internal power source judging circuit 45 outputs a judging signal at Hi level to the latch 43. At time t44, the judging signal is switched from Hi level to Lo level. The latch 43 is set at a falling edge of the judging signal, and the output of the latch 43 is fixed to Hi level. The output of the latch 43 is inputted to the internal power source 41, and the internal power source output, which is the output of the internal power source 41, is stopped. Due to the stop of the internal power source 41, the power source of the driver 42 is shut down, and thus Q1 drive signal and Q2 drive signal are stopped, the output voltage is reduced, and the load current no longer flows through the load 10, which causes the joint temperature of the switching device Q1 to be decreased. The overheat detection signal 1 may be outputted without using the internal power source judging circuit 45, and after elapse of a predetermined time, the overheat detector A44 may stop the internal power source 41.

The same operational effect as in embodiments 1, 2 is obtained by performing the operation as described above, and even when the microcomputer 403 malfunctions, the DC/DC converter 401 can be safely stopped.

Embodiment 5

Figure 9:
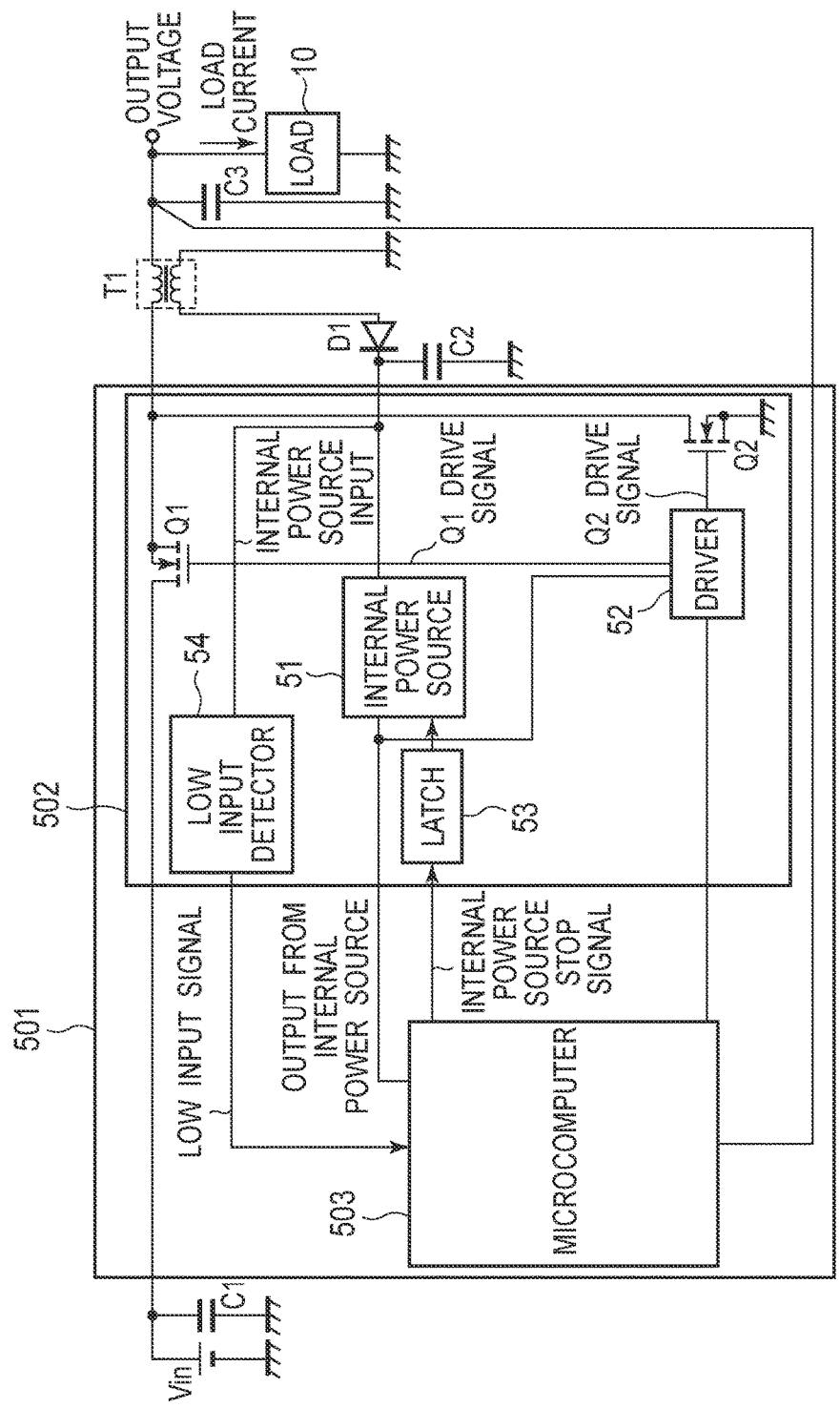
FIG. 9 is a circuit configuration diagram illustrating an implementation of a DC/DC converter according to embodiment 5.

FIG. 9 is a diagram illustrating the circuit configuration of a DC/DC converter 501 according to embodiment 5. FIG. 10 is a timing chart illustrating the operation of each unit of the DC/DC converter 501 according to embodiment 5. Embodiment 5 related to operation stop of the DC/DC converter 501 by low input detection. In the DC/DC converter 501 in embodiment 5, the overheat detector A24 in embodiment 2 is replaced by a low input detector 54. The low input detector 54 is connected to an internal power source input which is the input of an internal power source 51, and a microcomputer 503. The low input detector 54 is an example of the microcomputer stop transition unit according to one or more embodiments, and when the internal power source input, which is the input of the internal power source 51, falls below threshold Vth, outputs a low input signal as the microcomputer stop signal to the microcomputer 503. Alternatively, the input of the low input detector 54 may be connected to the input power source Vin or the output voltage, in other words, the output capacitor C3.

The operation of embodiment 5 will be described with reference to the timing chart of FIG. 10. At time t50 to t51, the input voltage of the internal power source 51 is decreased due to voltage drop or the like of the input power source Vin. At time t51, the joint temperature of the switching device Q1 reaches Vth which is a threshold of the low input detector 54, and the low input detector 54 outputs a low input signal at Hi level to the microcomputer 503. When receiving a low input signal at Hi level, the microcomputer 503 performs writing to a memory or the like during time t51 to t52, and transitions to a shutdown operation. At time t52, when the microcomputer 503 is in a state which allows shutdown, and is in a state which allows the internal power source output to be stopped, the microcomputer 503 outputs an internal power source stop signal at Hi level to the latch 53. At time t53, the internal power source stop signal is switched from Hi level to Lo level. The latch 53 is set at a falling edge of the internal power source stop signal, and the output of the latch 53 is fixed to Hi level. The output of the latch 53 is inputted to the internal power source 51, and the output of the internal power source 51 is stopped. Due to the stop of the internal power source 51, the power source of a driver 52 is shut down, and thus Q1 drive signal and Q2 drive signal are stopped, and the output voltage is reduced.

The same operational effect as in embodiment 1 is obtained by performing the operation as described above, and even when the internal power source input, which is the input of the internal power source 51, is reduced, the power conversion device 501 can be safely stopped.

Embodiment 6

Figure 12:
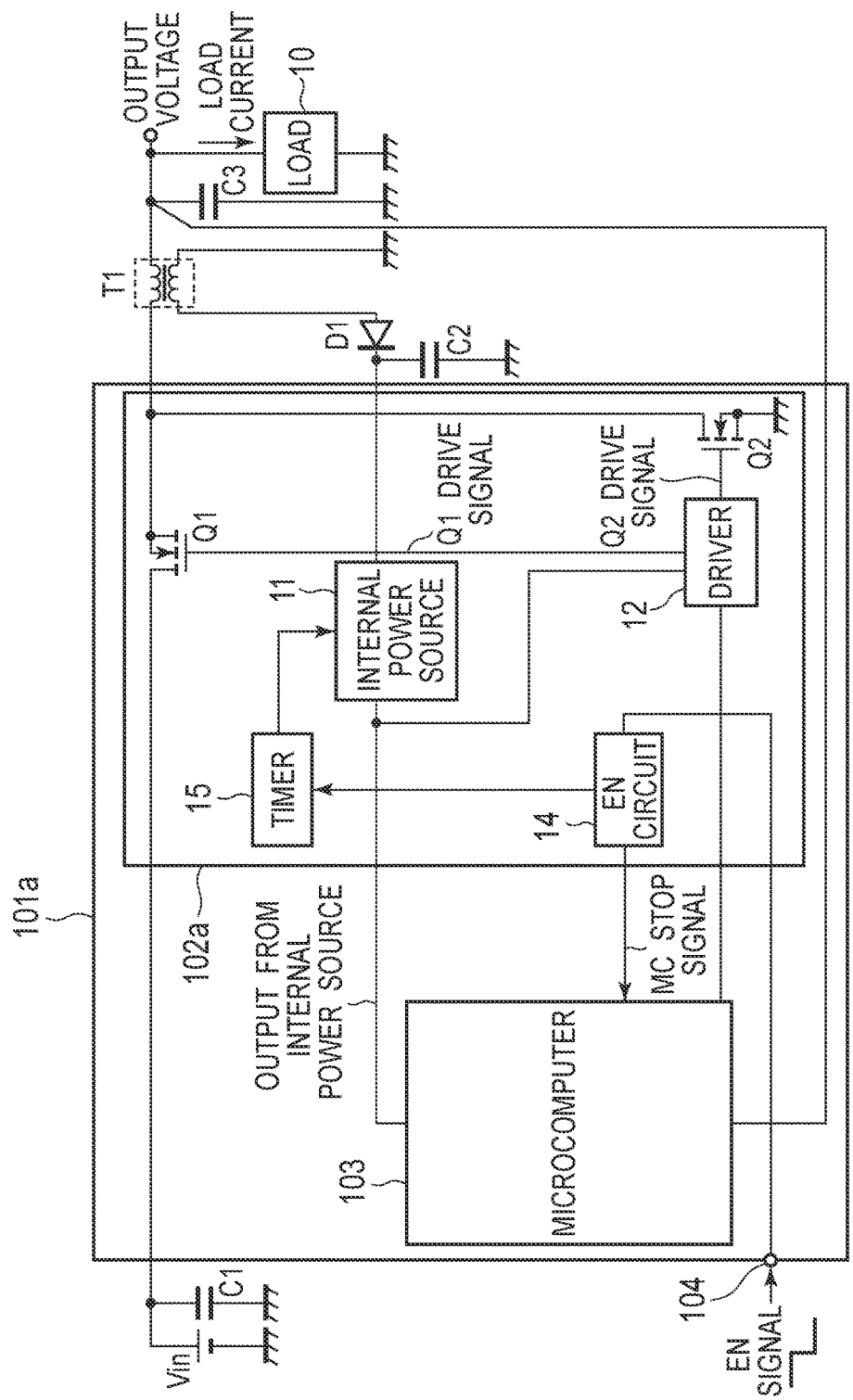
FIG. 12 is a circuit configuration diagram illustrating an implementation of a DC/DC converter according to embodiment 6.
Figure 13:
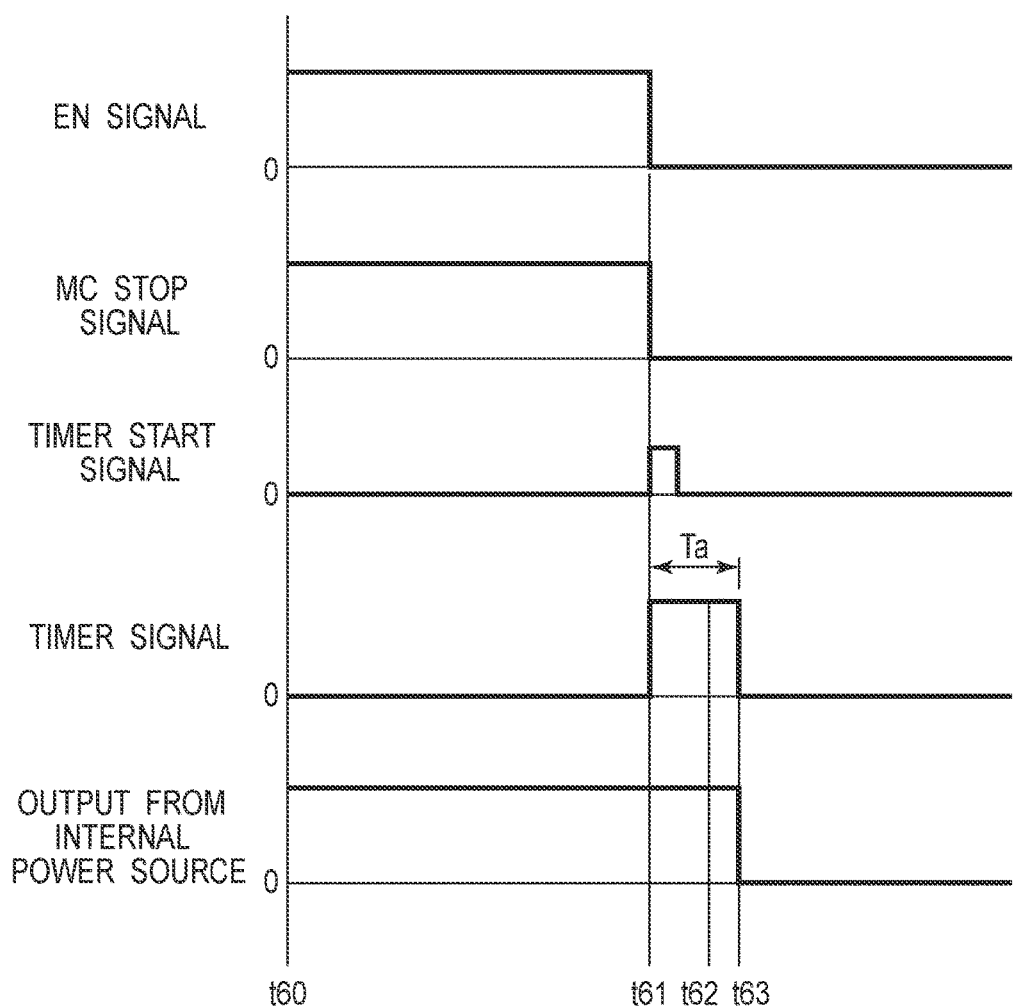
FIG. 13 is a timing chart illustrating the operation of each unit of the DC/DC converter according to embodiment 6.

FIG. 12 is a diagram illustrating the circuit configuration of a DC/DC converter 101a according to embodiment 6. FIG. 13 is a timing chart illustrating the operation of each unit of the DC/DC converter 101a according to embodiment 6. Embodiment 6 relates to operation stop of the DC/DC converter 101a by a timer. In embodiment 6, the internal power source stop signal from the microcomputer 103, and the latch 13 are excluded from the DC/DC converter 101 according to embodiment 1 illustrated in FIG. 1, and a timer 15 is included.

The timer 15 is an example of a timer according to one or more embodiments, and a predetermined time is measured since the output of a microcomputer stop signal to the microcomputer 103 by the EN circuit 14, and after the predetermined time is measured, the output of the internal power source 11 is stopped by a timer signal. The predetermined time is set to a time, from an input of the microcomputer stop signal from the EN circuit 14 by the microcomputer 103, greater than or equal to the time taken to achieve a state which allows the microcomputer 103 to be stopped. The time greater than or equal to the time taken to achieve a state which allows the microcomputer 103 to be stopped is, for instance, greater than or equal to a time necessary for writing data stored in a volatile memory such as random access memory to a non-volatile memory inside the microcomputer 103. The output of the EN circuit 14 is connected to an input terminal of the timer 15, and an output terminal of the timer 15 is connected to the internal power source 11.

The operation of embodiment 6 will be described with reference to the timing chart of FIG. 13. At time t60, an EN signal at Hi level is inputted to the EN terminal 104, and the EN circuit 14 outputs an MC stop signal at Hi level, in other words, a microcomputer stop signal to the microcomputer 103. Since the MC stop signal is Hi level, the microcomputer 103 operates normally, and the DC/DC converter 101a outputs the output voltage. At time t61, an EN signal at Lo level is inputted to the EN terminal 104, and the EN circuit 14 outputs an MC stop signal at Lo level to the microcomputer 103. At time t61, the EN circuit 14 outputs a timer start signal to the timer 15. When receiving an MC stop signal at Lo level from the EN circuit 14, the microcomputer 103 performs writing to a memory during time t61 to t62, and transitions to a shutdown operation. At time t62, the microcomputer 103 completes writing to a memory.

Meanwhile, when receiving a timer start signal from the EN circuit 14, a timer signal becomes Hi level, and the timer 15 starts counting, and counts a predetermined time Ta (=t63−t61). At time t63 when counting of the predetermined time Ta is completed, the timer 15 outputs a timer signal at Lo level to the internal power source 11 to stop the internal power source 11. Due to the stop of the internal power source 11, the power source of the driver 12 is shut down, and thus Q1 drive signal and Q2 drive signal are stopped, and the output voltage is reduced.

Similarly to the DC/DC converter in embodiment 1, the internal power source 11 is stopped by the above-described method, the DC/DC converter 101a can stop the output voltage quickly and safely.

Embodiment 7

Figure 14:
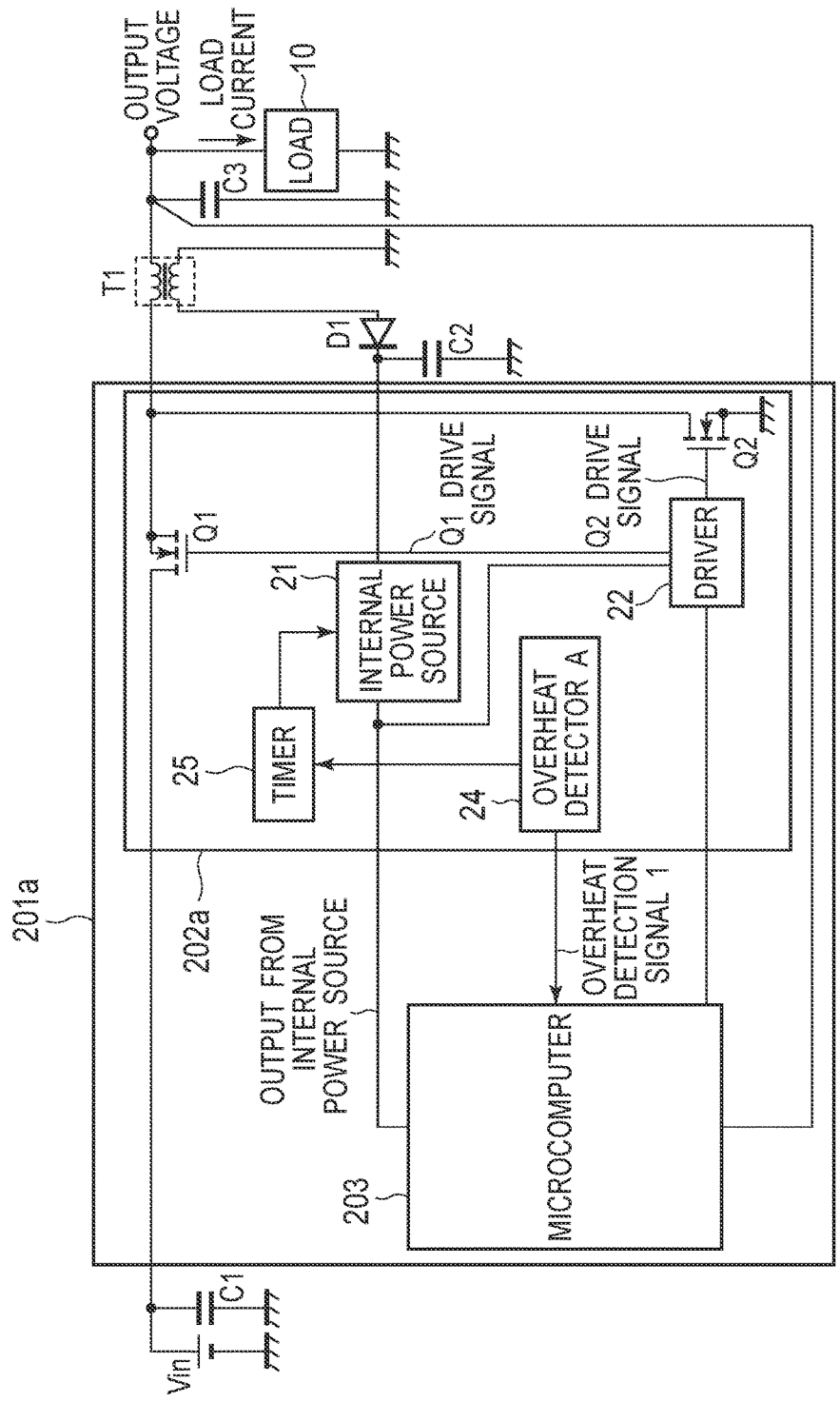
FIG. 14 is a circuit configuration diagram illustrating an implementation of a DC/DC converter according to embodiment 7.
Figure 15:
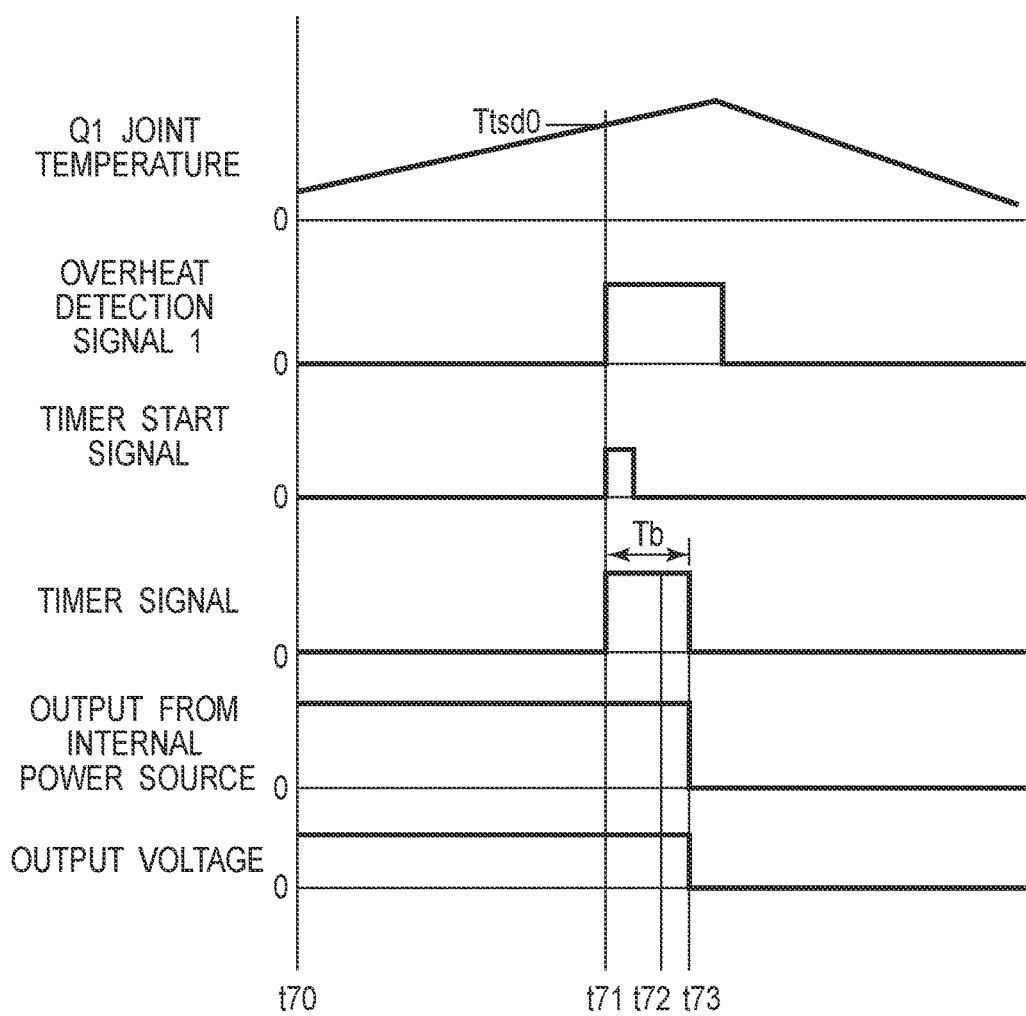
FIG. 15 is a timing chart illustrating the operation of each unit of the DC/DC converter according to embodiment 7.

FIG. 14 is a diagram illustrating the circuit configuration of a DC/DC converter 201a according to embodiment 7. FIG. 15 is a timing chart illustrating the operation of each unit of the DC/DC converter 201a according to embodiment 7. Embodiment 7 relates to the operation stop of the DC/DC converter 101a by a timer. In embodiment 7, the internal power source stop signal from a microcomputer 203, and the latch 23 are excluded from the DC/DC converter 201 according to embodiment 2 illustrated in FIG. 3, and a timer 25 is included.

The timer 25 is an example of a timer according to one or more embodiments, and a predetermined time is measured since the output of an overheat detection signal 1 to the microcomputer 203 by the overheat detector A24, and after the predetermined time is measured, the output of the internal power source 21 is stopped by a timer signal. The predetermined time is set to a time, from an input of the overheat detection signal 1 from the overheat detector A24 by the microcomputer 203, greater than or equal to the time taken to achieve a state which allows the microcomputer 203 to be stopped. The time greater than or equal to the time taken to achieve a state which allows the microcomputer 203 to be stopped is, for instance, greater than or equal to a time necessary for writing data stored in a volatile memory such as random access memory to a non-volatile memory inside the microcomputer 203. The output of the overheat detector A24 is connected to an input terminal of the timer 25, and an output terminal of the timer 25 is connected to the internal power source 21.

The operation of embodiment 7 will be described with reference to the timing chart of FIG. 15. At time t70, the load current is increased due to abnormality or the like of the load 10, and the joint temperature of the switching device Q1 is increased. At time t71, when the joint temperature of the switching device Q1 reaches threshold Ttsd0 of the overheat detector A24, the overheat detector A24 outputs an overheat detection signal 1 at Hi level to the microcomputer 203. When receiving an overheat detection signal 1 at Hi level, the microcomputer 203 performs writing to a memory or the like during time t71 to t72, and transitions to a shutdown operation. At time t72, the microcomputer 203 is in a state which allows shutdown.

Meanwhile, at time t71, when receiving a timer start signal from the overheat detector A24, a timer signal becomes Hi level, and the timer 25 starts counting, and counts a predetermined time Tb (=t73−t71). At time t73 when counting of the predetermined time Tb is completed, the timer 25 outputs a timer signal at Lo level to the internal power source 21 to stop the internal power source 21. Due to the stop of the internal power source 21, the power source of the driver 12 is shut down, and thus Q1 drive signal and Q2 drive signal are stopped, and the output voltage is reduced. The load current no longer flows through the load 10, which causes the joint temperature of the switching device Q1 to be decreased.

The internal power source 21 is stopped by the timer 25. An overheat state of the DC/DC converter 201a often occurs because of an abnormal state of the load 10, such as short-circuit of wiring or a load short circuit due to breakage of a load, and in many cases, the overheat state of the switching device Q1 continues. Thus, when the switching device Q1 is in an overheat state, the output of the DC/DC converter 201a is stopped by the timer 25, and is prevented from being started, and thus the time during which the DC/DC converter 201a is at a high temperature is reduced. When the abnormality of the load 10 is removed, the operation of the DC/DC converter 201a is resumed by restarting the input power Vin. The same operational effect as in embodiment 1 is obtained by performing the operation as described above.

Embodiment 8

Figure 16:
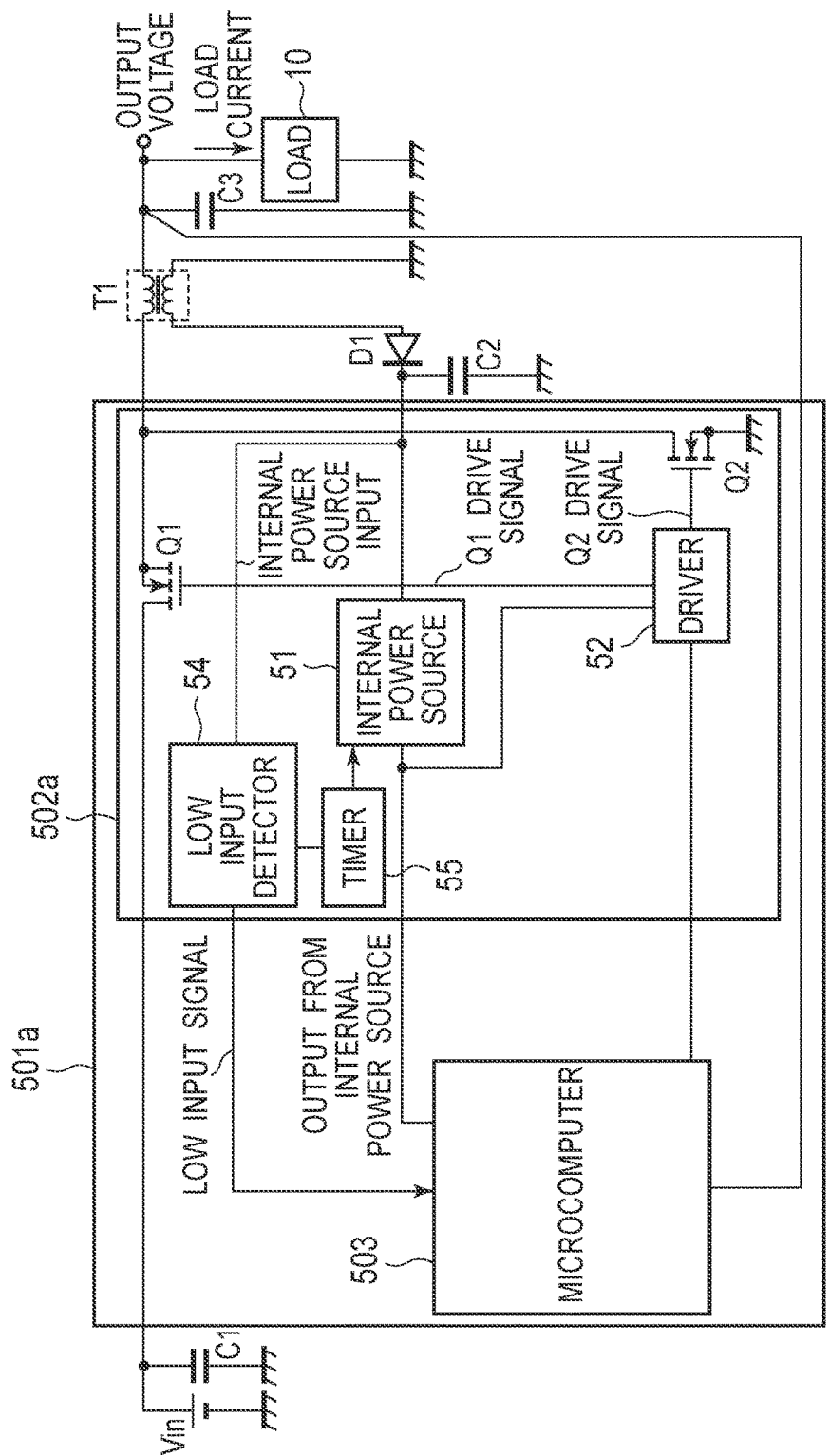
FIG. 16 is a circuit configuration diagram illustrating an implementation of a DC/DC converter according to embodiment 8.
Figure 17:
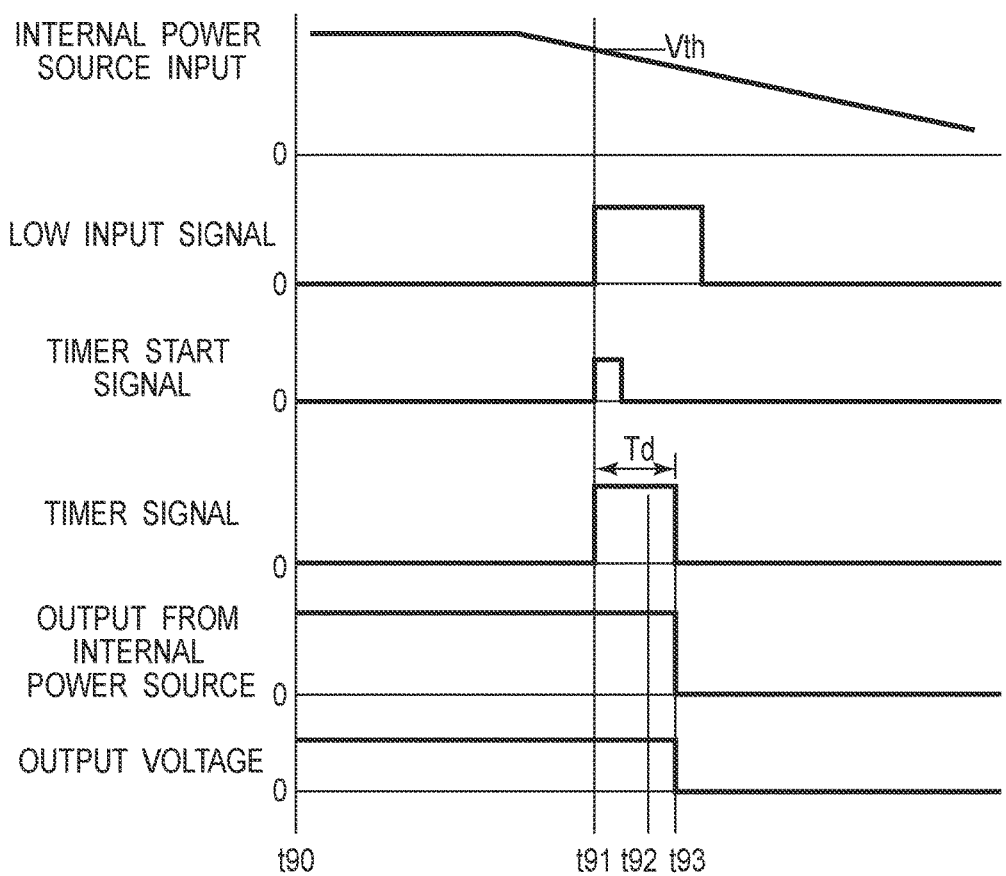
FIG. 17 is a timing chart illustrating the operation of each unit of the DC/DC converter according to embodiment 8.

FIG. 16 is a diagram illustrating the circuit configuration of a DC/DC converter 501a according to embodiment 8. FIG. 17 is a timing chart illustrating the operation of each unit of the DC/DC converter 501a according to embodiment 8. Embodiment 8 relates to operation stop of the DC/DC converter 501a by a timer. In embodiment 8, the internal power source stop signal from the microcomputer 503, and the latch 53 are excluded from the DC/DC converter 501 according to embodiment 5 illustrated in FIG. 9, and a timer 55 is included.

The timer 55 is an example of a timer according to one or more embodiments, and a predetermined time is measured since the output of a low input detection signal to the microcomputer 503 by the low input detector 54, and after the predetermined time is measured, the output of the internal power source 51 is stopped by a timer signal. The predetermined time is set to a time, from an input of the low input detection signal from the low input detector 54 by the microcomputer 503, greater than or equal to the time taken to achieve a state which allows the microcomputer 503 to be stopped. The time greater than or equal to the time taken to achieve a state which allows the microcomputer 503 to be stopped is, for instance, greater than or equal to a time necessary for writing data stored in a volatile memory such as random access memory to a non-volatile memory inside the microcomputer 503. The output of the low input detector 54 is connected to an input terminal of the timer 55, and an output terminal of the timer 55 is connected to the internal power source 51.

The operation of embodiment 8 will be described with reference to the timing chart of FIG. 17. At time t90 to t91, the input voltage of the internal power source 51 is decreased due to voltage drop or the like of the input power source Vin. At time t91, the joint temperature of the switching device Q1 reaches Vth which is a threshold of the low input detector 54, and the low input detector 54 outputs a low input signal at Hi level to the microcomputer 503. When receiving a low input signal at Hi level, the microcomputer 503 performs writing to a memory or the like during time t91 to t92, and transitions to a shutdown operation. At time t92, the microcomputer 503 is in a state which allows shutdown.

Meanwhile, at time t91, when receiving a timer start signal from the low input detector 54, a timer signal becomes Hi level, and the timer 55 starts counting, and counts a predetermined time Td (=t93−t91). At time t93 when counting of the predetermined time Td is completed, the timer 55 outputs a timer signal at Lo level to the internal power source 51 to stop the internal power source 51. Due to the stop of the internal power source 51, the power source of the driver 52 is shut down, and thus Q1 drive signal and Q2 drive signal are stopped, and the output voltage is reduced. The load current no longer flows through the load 10, which causes the joint temperature of the switching device Q1 to be decreased.

The same operational effect as in embodiment 1 is obtained by performing the operation as described above, and even when the internal power source input, which is the input of the internal power source 51, is reduced, the DC/DC converter 501 can be safely stopped.

Although the power conversion devices in embodiment 1 to embodiment 8 have been described above, the invention may be applied to the control circuits included in the power conversion devices in embodiment 1 to embodiment 8. The control circuits respectively include the microcomputers 103 to 503, and the components of the output circuits 102 to 502, 102a to 502a excluding the output units including the switching devices Q1, Q2. For instance, the control circuit in embodiment 1 illustrated in FIG. 1 includes the microcomputer 103, and the internal power source 11, the driver 12, the latch 13, and the EN circuit 14 which are the components of the output circuit 102 excluding the output units. For instance, the control circuit in embodiment 6 illustrated in FIG. 12 includes the microcomputer 103, and the internal power source 11, the driver 12, the EN circuit 14, and the timer 15 which are the components of the output circuit 102a excluding the output units.

Although description has been given using specific embodiments above, the embodiments are merely examples, and may be modified and practiced in a range without departing from the spirit of the disclosure. For instance, the power conversion device in the present disclosure is not limited to the DC/DC converters illustrated in embodiment 1 to embodiment 8, and may be a DC/AC converter or AC/AC converter that outputs an AC voltage, and may include a power conversion device that converts an input power to a desired output power. Alternatively, the DC/DC converters and the control circuits exemplified in embodiment 1 to embodiment 8 may be combined for the purpose of further improving the performance such as reliability.

As explained above, with the power conversion devices and the control circuits according to one or more embodiments described above, the operation of each power conversion device can be quickly and safely stopped after an operation stop state is assumed. In addition, with the power conversion devices and the control circuits according to one or more embodiments described above, each power conversion device controlled by a microcomputer can quickly perform operations until operation stop after detection of a stop signal. Also, since no power supply is mounted in the microcomputer, the chip size can be reduced.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A power conversion device comprising:
  a microcomputer; and
  an output circuit controlled by the microcomputer, comprising
    an output unit that converts an input power into a predetermined power and outputs the predetermined power,
    an internal power source that supplies a power source to the microcomputer,
    a driver that drives the output unit by a signal from the microcomputer, and
    a microcomputer stop transition unit that performs operations comprising, in response to an operation of the power conversion device being stopped, outputting a microcomputer stop signal to the microcomputer causing an operation of the microcomputer to transition to a stop state, wherein:
  after the microcomputer stop transition unit causes the operation of the microcomputer to transition to the stop state, the microcomputer or the output circuit stops an output of the internal power source; and
  in response to the microcomputer stop transition unit detecting a malfunction of the microcomputer that prevents the microcomputer or the output circuit from stopping the output of the internal power source, the microcomputer stop transition unit generates a signal that stops the output of the internal power source.

2. The power conversion device according to claim 1, wherein
in response to the microcomputer being in a state in which the microcomputer is to be stopped, the microcomputer outputs an internal power source stop signal to the internal power source, and transmits the internal power source stop signal to the internal power source.

3. The power conversion device according to claim 1, wherein
the output circuit comprises a timer that measures a predetermined time from the output of the microcomputer stop signal to the microcomputer by the microcomputer stop transition unit, and after the predetermined time is measured, transmits an internal power source stop signal to the internal power source.

4. The power conversion device according to claim 3, wherein
the predetermined time is set to a time, from an input of the microcomputer stop signal, greater than or equal to a time taken for the microcomputer to achieve a state in which the microcomputer is to be stopped.

5. The power conversion device according to claim 3, wherein
the microcomputer stop transition unit comprises an overheat detector that, when a temperature of the output unit becomes higher than or equal to a threshold temperature, outputs an overheat detection signal to the microcomputer as the microcomputer stop signal.

6. The power conversion device according to claim 1, wherein
the microcomputer stop transition unit comprises an enable circuit that turns on and off an output of the power conversion device by an enable signal, and outputs the enable signal to the microcomputer as the microcomputer stop signal.

7. The power conversion device according to claim 1, wherein
the microcomputer stop transition unit comprises a low input detector that, when an input voltage of the internal power source becomes lower than or equal to a threshold voltage, outputs a low input signal to the microcomputer as the microcomputer stop signal.

8. The power conversion device according to claim 1, wherein
the microcomputer stop transition unit comprises a low input detector that, when an input voltage of the power conversion device becomes lower than or equal to a threshold voltage, outputs a low input signal to the microcomputer as the microcomputer stop signal.

9. The power conversion device according to claim 1, wherein
the microcomputer stop transition unit comprises a low input detector that, when an output voltage of the power conversion device becomes lower than or equal to a threshold voltage, outputs a low input signal to the microcomputer as the microcomputer stop signal.

10. The power conversion device according to claim 1, wherein
the microcomputer stop transition unit comprises an overheat detector that, when a temperature of the output unit becomes higher than or equal to a threshold temperature, outputs an overheat detection signal to the microcomputer as the microcomputer stop signal.

11. The power conversion device according to claim 10, further comprising
an internal power source judging circuit that, after the overheat detector outputs the overheat detection signal to the microcomputer, monitors an internal power source output of the internal power source, and when the internal power source output is outputted after elapse of a certain time, stops the output of the internal power source.

12. The power conversion device according to claim 1, wherein
the microcomputer stop transition unit comprises a threshold overheat detector that detects a first threshold temperature, and a second threshold temperature higher than the first threshold temperature, wherein when a temperature of the output unit rises and exceeds the first threshold temperature, the threshold overheat detector outputs a first overheat detection signal to the microcomputer as the microcomputer stop signal, and when the temperature of the output unit exceeds the second threshold temperature, the threshold overheat detector stops the output of the internal power source.

13. The power conversion device according to claim 1, wherein
the output circuit and the microcomputer are incorporated in a same package.

14. A control circuit comprising:
a microcomputer;
an output circuit controlled by the microcomputer, comprising
an internal power source that supplies a power source to the microcomputer,
a driver that drives an output unit, which converts an input power into a predetermined power and outputs the predetermined power, by a signal from the microcomputer, and
a microcomputer stop transition unit that performs operations comprising, in response to an operation of the control circuit being stopped, outputting a microcomputer stop signal to the microcomputer causing an operation of the microcomputer to transition to a stop state, wherein:
after the microcomputer stop transition unit causes the operation of the microcomputer to transition to the stop state, the microcomputer or the output circuit stops an output of the internal power source; and
in response to the microcomputer stop transition unit detecting a malfunction of the microcomputer that prevents the microcomputer or the output circuit from stopping the output of the internal power source, the microcomputer stop transition unit generates a signal that stops the output of the internal power source.

\* \* \* \* \*